US008251330B2

(12) United States Patent
Stabler

(10) Patent No.: US 8,251,330 B2
(45) **Date of Patent: *Aug. 28, 2012**

(54) REMOVABLE DEVICE CONFIGURED TO SECURE AN INSTRUMENT AND TO BE MOUNTED ON A PLATFORM

(76) Inventor: Joshua Edward Stabler, San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/304,890

(22) Filed: Nov. 28, 2011

(65) Prior Publication Data

US 2012/0085876 A1 Apr. 12, 2012

Related U.S. Application Data

(63) Continuation of application No. 12/454,972, filed on May 27, 2009, now Pat. No. 8,083,198.

(51) Int. Cl.
*A47G 1/10* (2006.01)

(52) U.S. Cl. ............. 248/316.6; 248/316.4; 248/231.61; 248/231.41; 269/45; 224/558; 42/94; 211/43; 211/184

(58) Field of Classification Search ............. 248/229.12, 248/228.3, 230.31, 231.51, 316.4, 122.1, 248/126, 346.05, 346.07, 229.14, 229.24, 248/228.5, 177.1, 178.1, 316.1, 250, 316.6, 248/231.61, 229.22; 269/43, 45, 254 CS, 269/143, 249; 224/558, 570; 42/94; 24/569, 24/525, 514, 486; 211/43, 184, 175; 73/167
See application file for complete search history.

(56) References Cited

U.S. PATENT DOCUMENTS

| | | | | | |
|---|---|---|---|---|---|
| 7,326 | A | * | 4/1850 | Peck | 396/438 |
| 971,438 | A | * | 9/1910 | Gillitt | 248/227.4 |
| 2,261,055 | A | * | 10/1941 | Dulaney | 81/6 |
| 2,427,365 | A | * | 9/1947 | Meister | 269/152 |
| 2,545,844 | A | * | 3/1951 | Cougias | 211/43 |
| 2,870,683 | A | * | 1/1959 | Wilson | 89/40.06 |
| 2,880,490 | A | * | 4/1959 | Rizzatti et al. | 396/419 |
| 2,926,387 | A | * | 3/1960 | Lombardo et al. | 249/204 |
| 3,006,052 | A | * | 10/1961 | Stickney et al. | 248/187.1 |
| 3,016,802 | A | * | 1/1962 | Grunenberg | 89/40.06 |
| 3,218,058 | A | * | 11/1965 | Smith | 269/166 |
| 4,017,997 | A | * | 4/1977 | Peterson et al. | 42/94 |
| 4,265,045 | A | * | 5/1981 | Garbini | 42/94 |
| 4,341,375 | A | * | 7/1982 | Romanin | 269/43 |
| 4,531,559 | A | * | 7/1985 | Glasgo | 144/85 |
| 4,697,775 | A | * | 10/1987 | Wille | 248/231.41 |
| 4,841,839 | A | * | 6/1989 | Stuart | 89/37.04 |
| 4,915,273 | A | * | 4/1990 | Allen | 224/462 |
| 5,081,782 | A | * | 1/1992 | Wright | 42/94 |
| 5,112,015 | A | * | 5/1992 | Williams | 248/236 |
| 5,370,570 | A | * | 12/1994 | Harris | 446/227 |
| 5,375,337 | A | * | 12/1994 | Butler | 33/506 |
| 5,667,178 | A | * | 9/1997 | Yang | 248/262 |
| 5,697,601 | A | * | 12/1997 | Gurule | 269/43 |
| 5,769,292 | A | * | 6/1998 | Cucheran et al. | 224/324 |

(Continued)

*Primary Examiner* — Kimberly Wood
(74) *Attorney, Agent, or Firm* — Nicholas M. Stabler

(57) ABSTRACT

The present teachings relate to a device configured to secure an instrument and to be removably mounted to a platform. The device can comprise a mounting base platform, a guide rod plate, and a securing means. The guide rod plate can be slidably secured to the mounting base platform, and the securing means can be configured to slidably move the guide rod plate with respect to the mounting base platform. The device can secure an instrument within, for example a firearm or a scope. The device can be mounted to a platform, for example, a camera tripod.

12 Claims, 3 Drawing Sheets

U.S. PATENT DOCUMENTS 5,833,180 A * 11/1998 Baranowski .................. 248/118
6,272,785 B1 * 8/2001 Mika et al. ........................ 42/94
6,286,797 B1 * 9/2001 Thaxton ................... 248/229.14
6,324,729 B1 * 12/2001 Daubenthaler ................. 24/182
6,336,616 B1 * 1/2002 Lin .......................... 248/222.11
6,370,741 B1 * 4/2002 Lu ................................... 24/523
6,375,140 B1 * 4/2002 Shen ............................. 248/251
6,435,738 B1 * 8/2002 Vogt .............................. 396/419
6,499,158 B1 * 12/2002 Easterling ......................... 5/600
6,574,899 B1 * 6/2003 Mostello ........................... 42/94
6,600,827 B2 * 7/2003 Lu ................................. 381/388
6,773,172 B1 * 8/2004 Johnson et al. ............... 396/428
7,003,827 B2 * 2/2006 DeMayo ........................... 5/600
7,004,067 B1 * 2/2006 Godsey et al. .................. 101/35
7,043,861 B1 * 5/2006 Crawford ................... 40/611.11
7,047,610 B2 * 5/2006 Dawson ....................... 29/281.1
7,077,582 B2 * 7/2006 Johnson ........................ 396/428
7,093,811 B2 * 8/2006 Wu .......................... 248/229.12
7,121,516 B1 * 10/2006 Koh ......................... 248/226.11
7,175,143 B1 * 2/2007 Ho ................................ 248/215
7,219,866 B2 * 5/2007 Depay et al. ............. 248/229.22
7,356,960 B1 * 4/2008 Knitt ................................. 42/94
7,401,755 B2 * 7/2008 Wu .......................... 248/346.07
7,686,267 B2 * 3/2010 DaSilva ................... 248/229.12
7,823,844 B2 * 11/2010 Carnevali ................... 248/176.1
7,828,259 B2 * 11/2010 Wang et al. ................ 248/316.4
D631,525 S * 1/2011 Smith et al. .................. D22/108
2003/0140543 A1 * 7/2003 Yeargin ............................. 42/94
2003/0155478 A1 * 8/2003 Easterling .................. 248/316.1
2005/0230583 A1 * 10/2005 Wu .......................... 248/231.41
2009/0026679 A1 * 1/2009 Harman, III .................... 269/43
2009/0146357 A1 * 6/2009 Pietrantoni et al. ..... 269/254 CS
2010/0102178 A1 * 4/2010 Smith et al. ................ 248/122.1

* cited by examiner

REMOVABLE DEVICE CONFIGURED TO SECURE AN INSTRUMENT AND TO BE MOUNTED ON A PLATFORM

CROSS REFERENCE TO RELATED APPLICATIONS

This application is a continuation of U.S. patent application Ser. No. 12/454,972 filed on May 27, 2009 now U.S. Pat. No. 8,083,198, in the United States Patent & Trademark Office, the entire description of which is incorporated herein in its entirety.

FIELD OF THE INVENTION

This invention relates to a removable device that can be mounted on a platform. The device can secure an instrument to the platform.

DISCUSSION OF RELATED ART

The present invention relates to a device configured to be mounted on a platform and to secure an instrument within. In the art, methods, devices, apparatuses, and systems have been presented, focusing on securing an instrument to a platform. Several references describe the use of a portable stand in combination with a device. For example, U.S. Pat. No. 7,406,794 B1 to Pope, Jr. on Aug. 5, 2008, describes a portable rifle vise usable from a standing, sitting, or prone position. The vise, however, requires multiple components to be setup and attached before a rifle can be secured within, and is only configured to be coupled to the base plate described in Pope, Jr. Further, the vise comprises two supports, one for the rifle stock and the other for the butt of the rifle. The rifle stand described in U.S. Pat. No. US 7,281,347 B2, to Carpenter on Oct. 16, 2007, is similar to that of the gun vise of Pope, Jr. The rifle stand requires two supports, one for the stock and the other for the butt of the rifle. The rifle stand is not configured to be mounted on other stands besides the tripod described in Carpenter. The drawbacks with these two similar stands/supports are that each requires a substantially large stand that can be heavy and cumbersome, and can take up storage space. Further, the devices are only adapted to be used with the stands described therein.

Therefore, there is a need for a device that can easily be attached to and removed from a number of different types of stands. There is a need for a device that doesn't need a support for both the butt of a rifle, and the stock of a rifle. There is also a need for a device that is substantially smaller, lighter, and easier to transport and store. The present invention accomplishes these objectives.

SUMMARY OF THE INVENTION

The present invention relates to a device configured to be mounted on a platform and to secure an instrument within. The instrument can comprise, for example, a firearm, a scope, a camera, or other desired instrument. The platform can be, for example, a monopod, a bipod, a tripod, or other platform. The device can comprise a mounting base platform, a guide rod plate, and a securing means configured to slidably secure the guide rod plate to the mounting base platform. The mounting base platform can comprise a base plate and a U-shaped member. The base plate can comprise a contact surface that is configured to contact an instrument. The U-shaped member can extend outward from the base plate and can comprises one or more arms, a securing means opening configured to receive a securing means, and one or more guide rod openings configured to receive a guide rod. The U-shaped member can comprise one or more platform openings disposed on a platform attachment side of the U-shaped member. Each of the one or more platform openings can be approximately perpendicular to the first securing means opening and the one or more guide rod openings, and each platform opening being configured to attach the device to a platform.

The guide rod plate can be slidably attached to the mounting base platform. The guide rod plate is configured to traverse the mounting base platform. The guide rod plate can comprise a contact surface that opposes the first contact surface when the guide rod plate is attached to the mounting base platform. The contact surface can also be configured to contact an instrument. The guide rod plate can comprise one or more notches that align with the two arms of the U-shaped member. The guide rod plate can comprise one or more guide rods that can each align with a respective guide rod opening of the U-shaped member, such that a guide rod can be inserted into the guide rod opening. The guide rod plate can comprise a securing means opening aligned with the securing means opening of the mounting base platform. In some embodiments, rubber can be disposed on an upper surface of the U-shaped member. In some embodiments rubber can be disposed on the contact surfaces of the guide rod plate and the mounting base platform. In some embodiments, the mounting base platform and/or the guide rod plate can be formed out of hollowed metal.

The device can further comprise a securing means that can be disposed in the securing means opening of the mounting base plate and the securing means opening of the guide rod plate. The securing means can be inserted into the securing means openings to secure the device in an assembled configuration. In such an assembled configuration, the securing means can slidably traverse the guide rod plate with respect to the mounting base plate such that an instrument can be secured within the device. The securing means can comprise at least one of a screw or a bolt.

The present teachings also describe a system comprising the device, a platform, and an instrument, wherein the device has been secured to the platform, and the instrument has been secured within the device.

Other features and advantages of the present invention will become apparent from s the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 2:
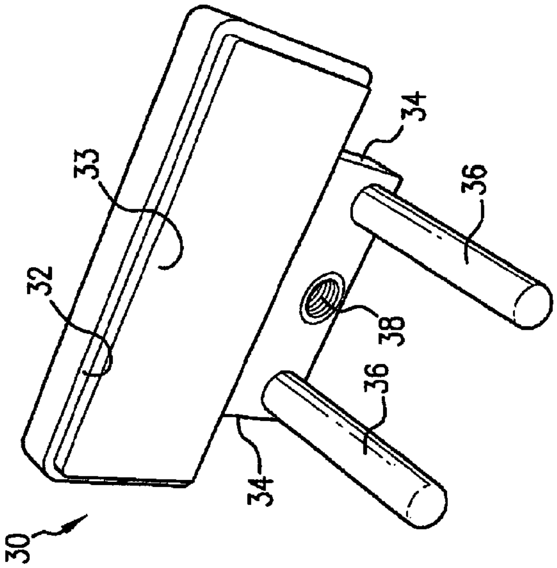
FIG. 2 is a perspective view of a guide rod plate, configured to slidably traverse the mounting base platform and to be used with the device.
Figure 1:
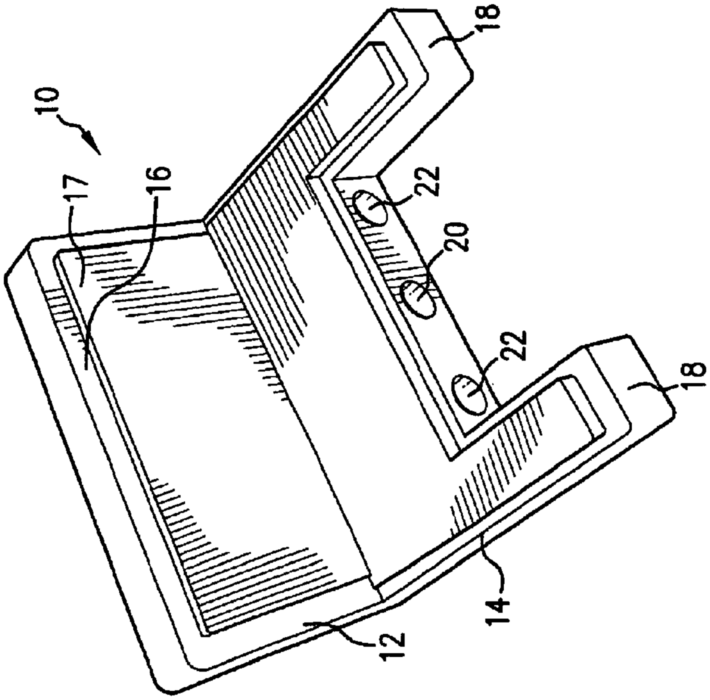
FIG. 1 is a perspective view of a mounting base platform configured to be used with the device.
Figure 3:
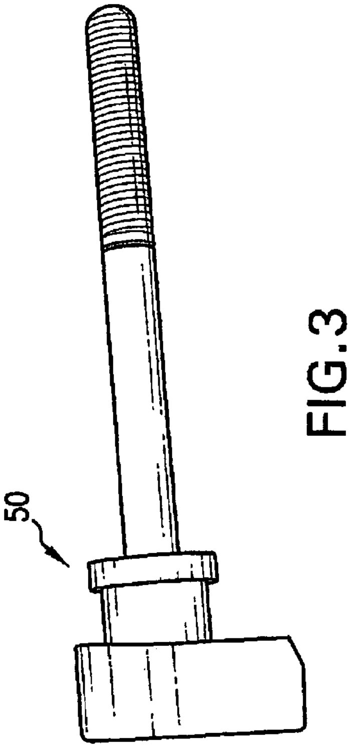
FIG. 3 is a perspective view of a securing means that is configured to secure the mounting base platform to the guide rod plate.

The present teachings relate to a device that can secure an instrument within. The device can be removably mounted to a platform, for example, a monopod, a bipod, a tripod, or other platform. The device is adapted to secure an instrument by securing a section of the instrument within the device. The device is configured to be relatively small, lightweight, and easy to transport. The instrument can comprise, for example, a firearm, a telescope, a camera, or other instrument desired. As shown in FIGS. 1-3, device 2 can comprise multiple components, for example, the mounting base platform as shown in FIG. 1, the guide rod plate as shown in FIG. 2, and the locking means as shown in FIG. 3. Referring now to FIG. 1, mounting base plate 10 can comprise a base plate 12 and a U-shaped member 14. Base plate 12 and U-shaped member 14 can be formed of the same piece of metal, or can be welded, bolted, or otherwise fastened to each other. The U-shaped member can extend away from the base plate in a direction that is approximately perpendicular to the base plate.

According to various embodiments, base plate 12 can comprise a first contact surface 16 that can be configured to contact an instrument. In some embodiments, contact surface 16 can be coated with rubber 17. U-shaped member 14 can comprise one or more arms 18, for example, two, three, four, or more arms. Each arm can extend outward from the base plate a desired distance, for example, from about 0.5 inches to 10 inches, from about 1 inch to 6 inches, from about 3 inches to 5 inches, or other desired distance. In the exemplary embodiment illustrated in FIG. 1, two arms extend away from the mounting base platform and are disposed on opposing sides of the mounting base platform. As will be appreciated, the device is not limited to this construction. In some embodiments, the arms can extend away from the base plate at any desired location, for example, from the middle of the base plate.

As shown in FIG. 1, U-shaped member 14 can comprise one or more securing means openings 20 configured to receive a securing means, for example, a screw, a bolt, a nut, a lock, a combination thereof, or other fastening device. Securing means opening 20 can be threaded, but it is not required to be threaded. U-shaped member 14 can comprise one or more guide rod openings 22 that are approximately parallel to the one or more securing means openings 20. Each guide rod opening 22 can be configured to receive a guide rod. In some embodiments, the guide rod opening extends all the way through the U-shaped member, while in some embodiments the guide rod opening ends inside the U-shaped member.

Figure 4:
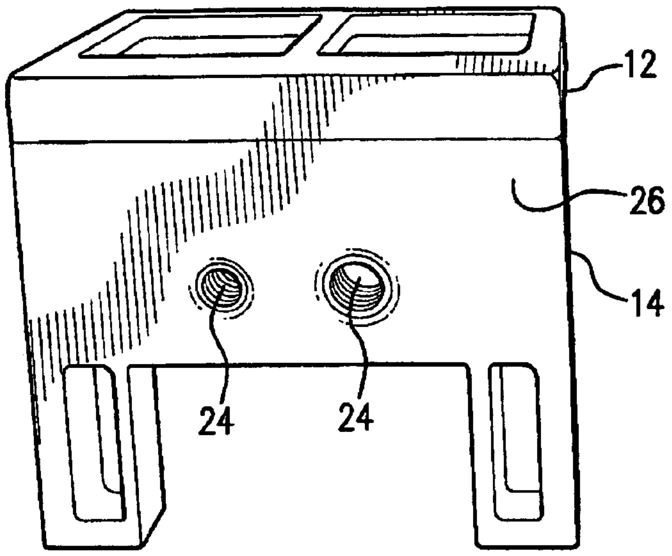
FIG. 4 is an underside view of the mounting base platform of FIG. 1.

FIG. 4 illustrates the underside of the mounting base platform. The underside of U-shaped member 14 can comprise one or more platform openings 24 disposed on platform attachment side 26 of U-shaped member 14. In some embodiments, the one or more platform openings 24 can be threaded such that the tip of a screw or a bolt can be inserted into the one or more platform openings to fasten the device to a platform. The one or more guide rod openings and the one or more securing means openings can be disposed approximately perpendicular to the one or more platform openings. The diameter of the platform openings can be of any desired size, for example, 1 mm, 2 mm, 3 mm, 4 mm, or other desired diameter.

In some embodiments, the one or more platform openings comprise at least two platform openings, wherein the at least two platform openings are each of different diameters. The platform openings can be configured to attach the U-shaped member to a platform such as, for example, the MANFROTTO® 190 CX3 camera tripod and the MANFROTTO® 700 RC2 video head, manufactured by the Bogen Photo Corporation, New York, the GITZO® GT1931 and the GITZO® G2220 tripods, manufactured by the Gitzo S. A. Corporation, France, the NIKON® 822 and NIKON® 847 tripods, manufactured by Nikon Inc., New York, N.Y., the LEUPOLD® 56446 tripod and the LEUPOLD® 62755 tripod, manufactured by Leupold & Stevens, Inc., Beaverton, Oreg., the BUSHNELL® 783001 and the BUSHNELL® 784040 tripods, manufactured by Bausch & Lamb, Inc., Rochester, N.Y., and the CELESTRON® 93604 and the CELESTRON® 93607 tripods, manufactured by the Celestron International Corporation, Torrance, Calif. As will be appreciated, these tripods, bipods, and monopods are merely listed as examples. The present teachings are not limited to these specific models or brands.

As shown in FIG. 2, device 2 can comprise a guide rod plate 30 that can be configured to be assembled to mounting base platform 10. Guide rod plate 30 can comprise a contact surface 32 that can be configured to contact an instrument. In some embodiments, contact surface 32 can be coated with rubber 33. Guide rod plate 30 can comprise one or more notches 34 that can be configured to align with the one or more arms 18 of the mounting base platform 10. The number of notches 34 can be equal to the number of arms 18. Each notch 34 can comprise an upper portion that can be configured to contact the top surface of an arm 18. Guide rod plate 30 can comprise one or more guide rods 36 that can extend away from guide rod plate 30 in a direction that is approximately perpendicular to guide rod plate 30. Each guide rod 30 can be configured to align with a respective guide rod opening 22 of the base plate 12 of mounting base platform 10. Guide rod plate 30 can comprise one or more securing means openings 38 that can be configured to receive a securing means. Securing means opening 38 can be threaded. In some embodiments, securing means opening 38 is not threaded. Securing means opening 38 can be aligned with securing means opening 20 of U-shaped member 14, such that a securing means can be inserted into both securing means opening 20 and securing means opening 38.

As shown in FIG. 3, device 2 can comprise one or more securing means 50 that can be configured to be inserted into the one or more securing means openings of the U-shaped member and the one or more securing means openings of the guide rod plate. Securing means 50 can be configured to secure an instrument within the device. The securing means can comprise a threaded feature, for example, a screw, a bolt, or other feature. In some embodiments securing means opening 20 of mounting base platform is not threaded, while securing means opening 38 of guide rod plate 30 is threaded. In such a configuration, securing means 50 can be turned to cause the contact surface of the guide rod plate to move slidably with respect to the contact surface of the mounting base platform. The notches of the guide rod plate can be configured to snugly align with the arms of the mounting base platform. The guide rod plate can traverse the mounting base platform. As will be appreciated, when turned in a first direction, securing means 50 can cause the contact surface of the guide rod plate to move closer to the contact surface of the mounting base platform. When an instrument is placed between the two contact surfaces, the securing means can be turned and can cause the instrument to be contacted on opposing sides by the contact surface of the guide rod plate and the contact surface of the mounting base platform. This contact can create friction and pressure between the contact surfaces and the instrument. The securing means can be turned such that the instrument is snugly secured in between the two contact surfaces. In some embodiments, rubber can be disposed on the two contact surfaces. The rubber can cause a more secure fit for the instrument. The rubber can absorb shock from the instrument, for example, when a firearm is discharged.

When turned in a second direction, securing means 50 can cause the contact surface of the guide rod plate to move away from the contact surface of the mounting base platform. This can release pressure and friction between the contact surfaces and the instrument, and can allow for the instrument to be removed from the device.

The securing means, the guide rod plate, and/or the mounting base plate can comprise any kind of metal, for example, aluminum, steel, copper, chromium, cobalt, gold, iron, lead, magnesium, manganese, mercury, nickel, platinum, silver, tin, titanium, tungsten, zinc, an alloy of any of these metals, a combination thereof, or any suitable metal that can be used in the system. The metal can be solid all the way through, hollowed out, partially hollowed out, or a combination thereof.

Device 2 can comprise an assembled configuration 100, as shown in FIG. 4. Guide rod plate 30 can be assembled to mounting base plate 10, and securing means 50 can be configured to slide the guide rode plate and the mounting base plate towards each other and away from each other on sliding axis 110. As the securing means is turned in a first direction it can cause the guide rod plate to traverse the mounting base platform. As shown in FIG. 4, rubber can be disposed on one or more of contact surface 16, contact surface 32, and upper edge 40. In some embodiments, rubber is disposed on each of contact surface 16, contact surface 32, and upper edge 40. The rubber can be configured to absorb shock and/or recoil when an instrument is used, for example, when a firearm is fired. The rubber can be configured to assist in gripping an instrument. As will be appreciated, a rubber surface can provide more friction than a metal surface. Securing means 50 can comprise a threaded feature. The securing means can be rotated a first way, and can be configured to slide contact surface 32 of guide rod plate 30 towards contact surface 16 of mounting base plate 10. Securing means 50 can be rotated in an opposite direction, and can be configured to slide contact surface 32 of guide rod plate 30 away from contact surface 16 of mounting base plate 10.

Figure 5:
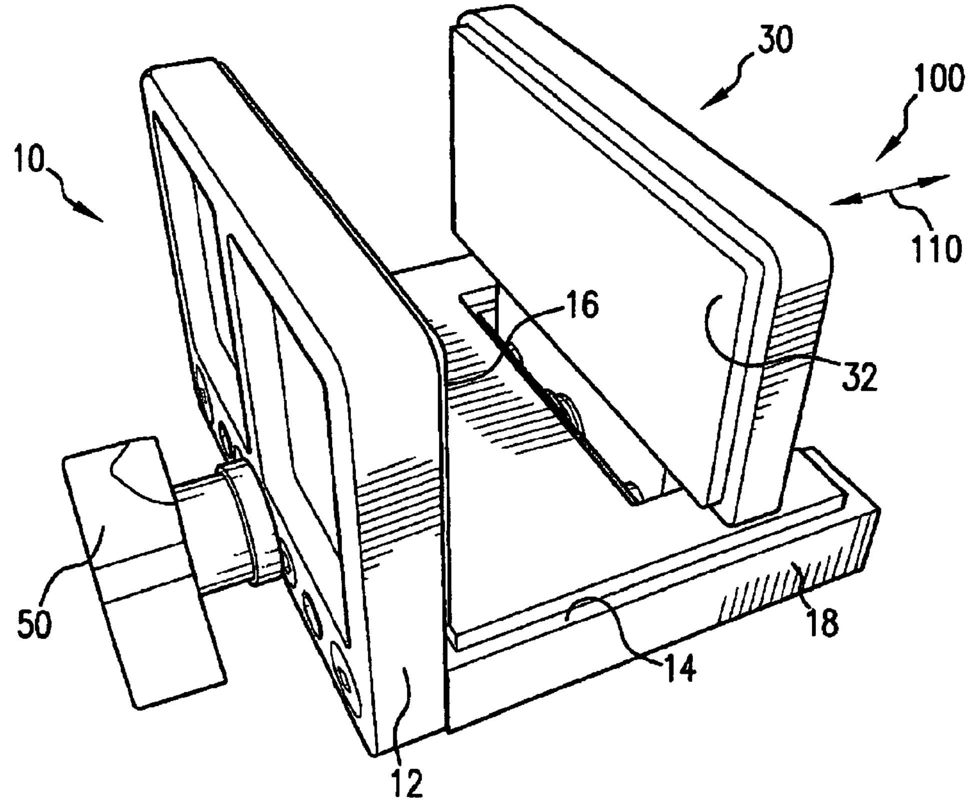
FIG. 5 is the device in an assembled configuration such that the securing means is securing the guide rod plate to the mounting base platform.
Figure 6:
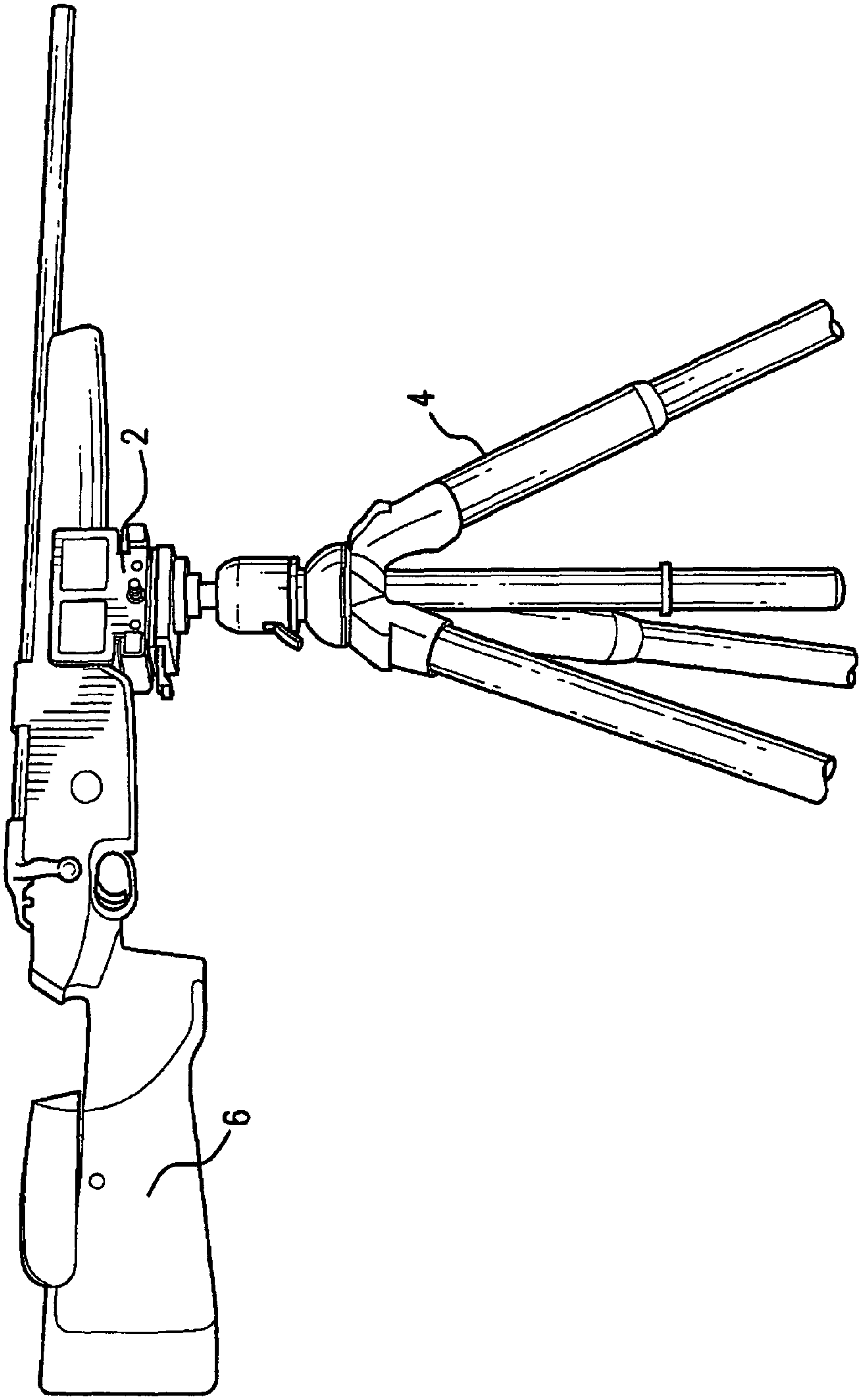
FIG. 6 is a system comprising the device illustrated in FIG. 5, mounted to a platform, and securing an instrument within.

FIG. 5 illustrates a system comprising the device, a platform, and an instrument. Device 2 can be mounted to platform 4. Screws or other threaded features (not shown) can be inserted into platform 4 and further can be inserted into the one or more platform openings of the U-shaped member. Once inserted into the platform openings, the screws can be turned, to thereby secure the device to the platform. In some embodiments, the one or more platform openings can be threaded, allowing for the U-shaped member to be locked or secured to the platform with a threaded feature inserted from below, through the platform, and into the device. Device 2 can be configured to secure instrument 6 within device 2. The device can be configured to stably secure instrument 6. The device can provide a stable platform preventing the instrument or other desired object from being able to move at all. The rubber can help grip the desired object and absorb any recoil or vibrations caused by the desired object. The device can be mounted to a platform that is capable of moving vertically and/or horizontally. The device can move wherever the platform can be adjusted to. The platform can comprise a swivel head and the device can be mounted to the swivel head of the platform, and can turn on with the swiveled head of the platform. The device can be attached to a platform, and can move with the platform in any manner in which the platform itself can move.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A stabilizing assembly that keeps an instrument in a desired position while allowing a user to control the movement of the instrument with one hand, the stabilizing assembly comprising:

an L-shaped platform comprising a base plate and a U-shaped member, the base plate comprising a first contact surface that is configured to contact the instrument, the U-shaped member extending outward from the base plate and comprising, two rectangular shaped arms that extend outwards and that generate a U-shape, a first securing means opening configured to receive a first securing means, one or more guide rod openings parallel to the first securing means opening, each guide rod opening configured to receive a guide rod, and one or more platform openings disposed on a platform attachment side of the U-shaped member, each of the one or more platform openings being approximately perpendicular to the first securing means opening and the one or more guide rod openings, and each platform opening comprising a threaded feature configured to receive a second securing means;

a guide rod plate attached to the L-shaped platform, comprising, a second contact surface that opposes the first contact surface, and the second contact surface is configured to contact the instrument, two notches that align with the two arms of the U-shaped member, one or more guide rods that each align with a respective said guide rod opening of the U-shaped member and that are to be inserted into the one or more guide rod openings, and a second securing means opening comprising a threaded feature which is aligned with the first securing means opening, the second securing means opening configured to receive the first securing means; and the first securing means to be inserted through the first securing means opening and inserted into the second securing means opening, the first securing means comprising a handle that has a shape that is capable of being turned by one hand of the user for securing the instrument within the assembly while the instrument is disposed in the assembly.

2. The stabilizing assembly of claim 1, wherein the first securing means comprises at least one of a screw or a bolt.

3. The stabilizing assembly of claim 1, wherein the instrument is a firearm.

4. The stabilizing assembly of claim 1, wherein the instrument is a camera.

5. The stabilizing assembly of claim 1, wherein the platform openings are configured to removably attach the device to a camera tripod.

6. The stabilizing assembly of claim 1, wherein the U-shaped member comprises an upper surface and wherein rubber is disposed on the upper surface.

7. The stabilizing assembly of claim 1, wherein rubber is disposed on the first contact surface.

8. The stabilizing assembly of claim 1, wherein rubber is disposed on the second contact surface.

9. The stabilizing assembly of claim 1, wherein at least one of the L-shaped platform and the guide rod plate are formed of hollowed out metal.

10. The stabilizing assembly of claim 1, wherein the guide rod plate has been assembled to the L-shaped platform, and the first securing means has been inserted into the first securing means opening of the L-shaped platform and the second securing means opening of the guide rod plate.

11. The stabilizing assembly of claim 1, wherein the one or more guide rods comprise two guide rods that are disposed between the two notches, and the one or more guide rod openings comprise two guide rod openings that are disposed between the two arms and that are configured to simultaneously receive the two guide rods.

12. The stabilizing assembly of claim 1, wherein the notches each comprise a flat outer surface and the arms each comprise a flat inner surface that is configured to slidably contact the flat outer surface of the notches.

* * * * *